Sept. 25, 1923.  
H. PIEPER  
1,468,920  
ELECTRIC LOCOMOTIVE  
Filed June 23, 1921   6 Sheets-Sheet 1

Inventor  
Henri Pieper  
By Lawrence Langner  
Attorney.

Sept. 25, 1923.

H. PIEPER 1,468,920

ELECTRIC LOCOMOTIVE

Filed June 23, 1921　6 Sheets-Sheet 2

Inventor
Henri Pieper
By
Lawrence Langner
Attorney

Sept. 25, 1923.

H. PIEPER 1,468,920

ELECTRIC LOCOMOTIVE

Filed June 23, 1921    6 Sheets-Sheet 3

Inventor
Henri Pieper
Lawrence Langner
Attorney

Sept. 25, 1923.

H. PIEPER

ELECTRIC LOCOMOTIVE

Filed June 23, 1921    6 Sheets-Sheet 6

1,468,920

Inventor
Henri Pieper
By Lawrence Languer
Attorney

Patented Sept. 25, 1923.

1,468,920

UNITED STATES PATENT OFFICE.

HENRI PIEPER, OF LIEGE, BELGIUM, ASSIGNOR TO CONSTRUCTIONS ELECTRIQUES DE BELGIQUE, SOCIETE ANONYME, OF BRUSSELS, BELGIUM.

ELECTRIC LOCOMOTIVE.

Application filed June 23, 1921. Serial No. 479,942.

*To all whom it may concern:*

Be it known that I, HENRI PIEPER, engineer, a subject of the King of Belgium, and resident of Liege, 56 Quai de Fragnee, Belgium, have invented certain new and useful Improvements in Electric Locomotives; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an electric locomotive which may comprise any number of axles, each of the axles being operated by an independent motor.

Locomotives of this kind which have hitherto been constructed are generally provided with a motor similar to those used for electric tramways, each of them actuating the axles by means of gears. This arrangement cannot be used for locomotives of high power, because the space which is available for the motors is insufficient; moreover, it has the great drawback of causing a considerable part of the weight of the motors to be directly supported by the axles, and therefore, the centre of gravity is relatively low.

Further, experience has shown that for high speed locomotives, it is preferable in order to avoid an excessive fatigue of the permanent way, to raise the centre of gravity, and on the other hand, the actuation of the axles by means of an arrangement of connecting rods and cranks has not given good results for high speeds, and it is considered that the most favourable arrangement for this kind of locomotive is to actuate each axle by means of an independent motor.

The present invention realizes the above desiderata by arranging the motors vertically, each above the axle which it actuates.

The motors are fixed on to the frame of the carriage; and form a rigid whole together with the driving shafts of the axles which they actuate by means of gears, endless screws or other transmission members.

The connection between the said driving shafts and the wheels is effected by means of members allowing displacements of the said axles relatively to the said driving shafts.

In a particular mode of carrying the invention into effect, the said driving shafts are hollow and each of them is traversed by a corresponding axle, the said axles being arranged in such a manner as to be capable of a displacement relatively to the said hollow shafts. The latter drive the wheels by means of springs or any other members allowing the said displacements, whilst imparting a certain resiliency to the transmission.

In order to avoid the influence of gyroscopic effects, the motors may be arranged in such a manner that the neighbouring motors shall rotate in opposite directions.

When a relatively high power is to be transmitted to each axle, a limitation is caused by the dimensions of the gears. In order to avoid the said drawback, each axle may be actuated by two independent shafts, each carrying an armature, the said armatures rotating in two different magnetic fields arranged in one motor head only, each armature operating the axle by means of gears.

It should be pointed out that the increase in the number of armatures allows an increase of the number of possible combinations of couplings.

In order to reduce the distance between the said two shafts, the different magnetic fields of each motor may be separated by a simple partition which realizes for each of them a consequent pole of the same polarity.

In the case of motors comprising two shafts and two armatures, the gyroscopic effect may be annulled in each motor by turning the shafts in opposite directions.

The drawings accompanying the present description illustrate by way of example two modes of carrying the invention into effect.

In the drawings:

Figures 1 to 4 relate to one mode of construction.

Figs. 5 to 8 relate to the second mode of construction.

The following remarks relate to a second mode of construction.

Figure 5:
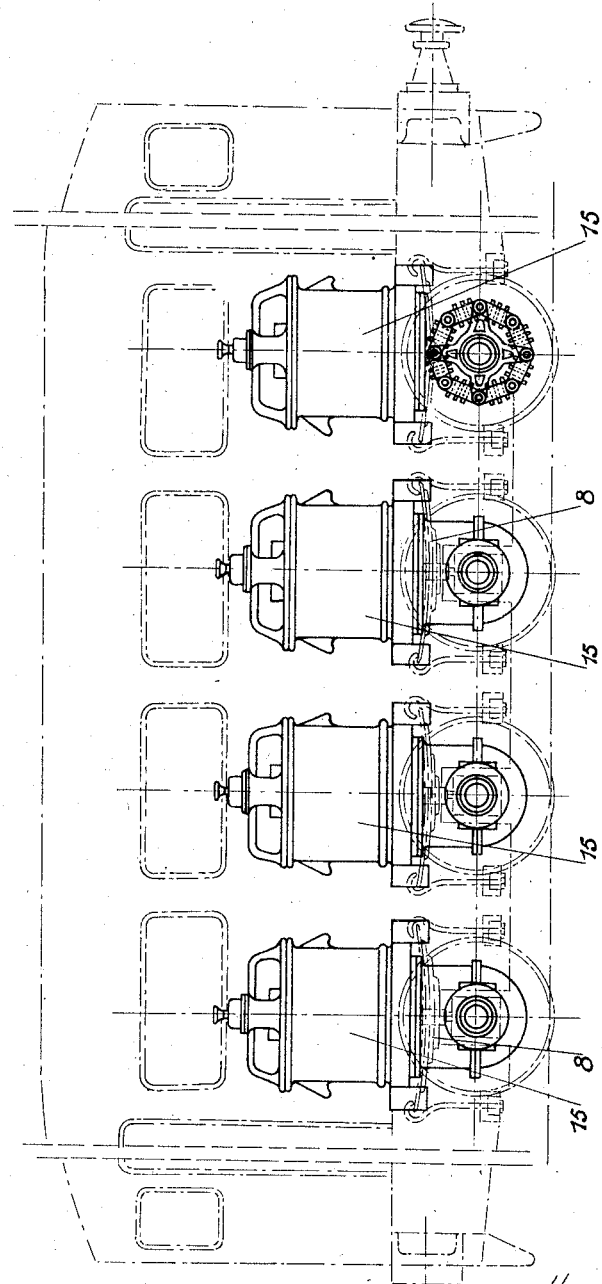

Figure 5 is an elevation showing the arrangement of the motors above the axles.

Figure 6:
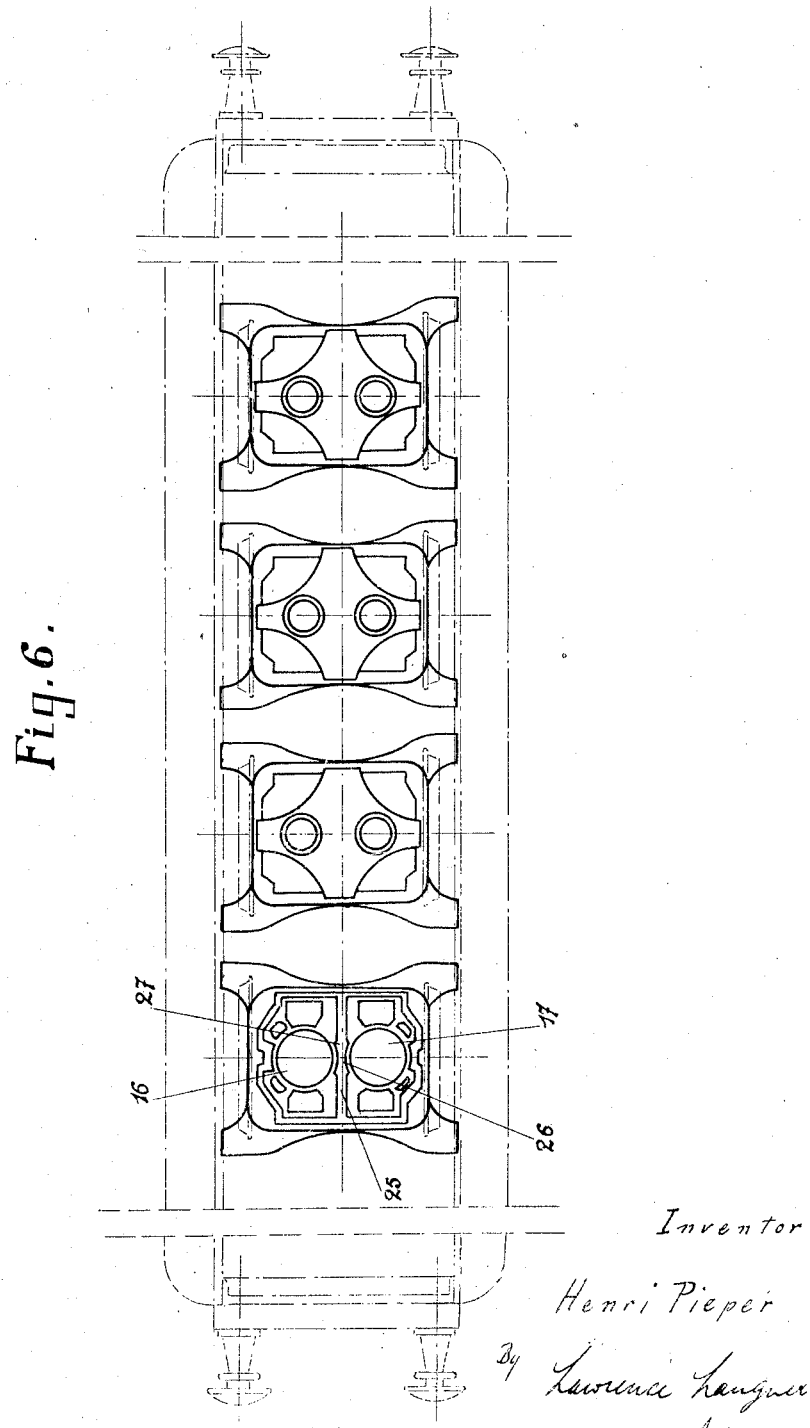

Figure 6 is a plan view with partial section.

Figure 7:
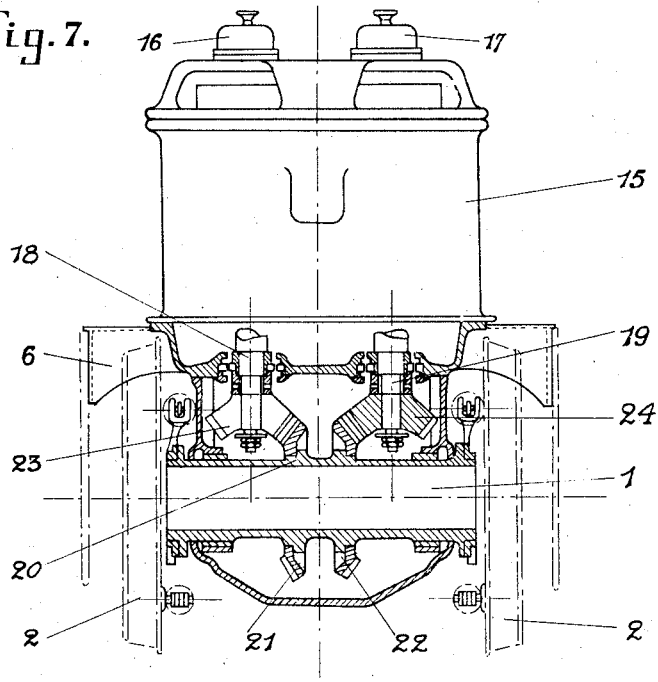

Figure 7 shows a motor projected on a plane perpendicular to an axle. This figure comprises a partial section made along the axis of the axle.

Figure 8:
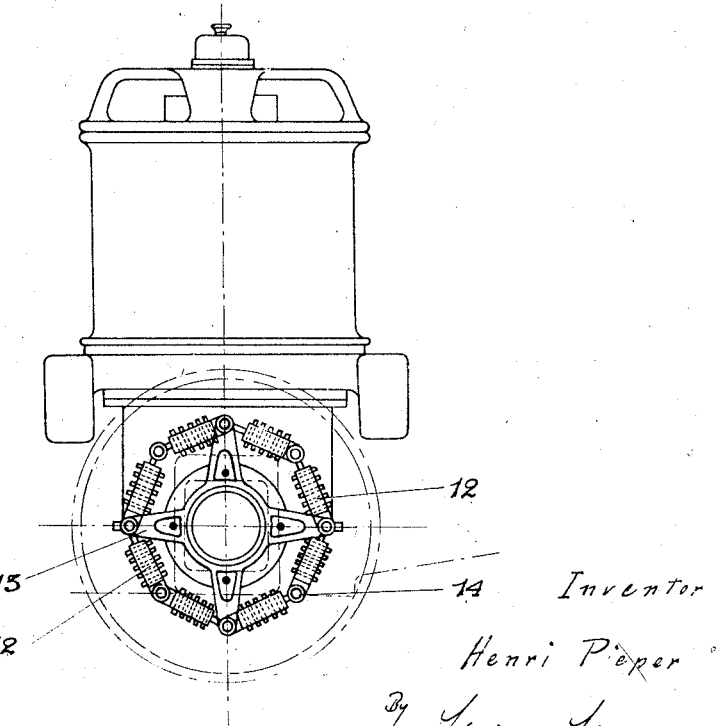

Figure 8 shows a mode of projection on a plane perpendicular to the axle.

In the case of Figures 1 to 4, the wheels 2 of each axle 1 are actuated by one driving shaft only 3. The motor 4, the transmission members and the casings such as 5 are carried directly by the frame 6. The axles 1 pass freely and with a certain play through hollow shafts 7 belonging to the transmission members and are connected to the frame through the intermediary of suspension springs 8 in the usual manner. The hollow shafts 7 are actuated by the driving shaft 3 through the intermediary of conical pinions 9 and 10, the said shafts rotate in bearings 11 integral with the casings 5.

The movement of rotation of the hollow shafts 7 is transmitted to the wheels 2 by means of members allowing a free displacement of the axles inside the hollow shafts. To this end, use is made of springs 12 which are fixed at one end to arms 13 integral with the hollow shafts 7, and at the other end to pins 14 integral with the wheels 2.

Figure 1:
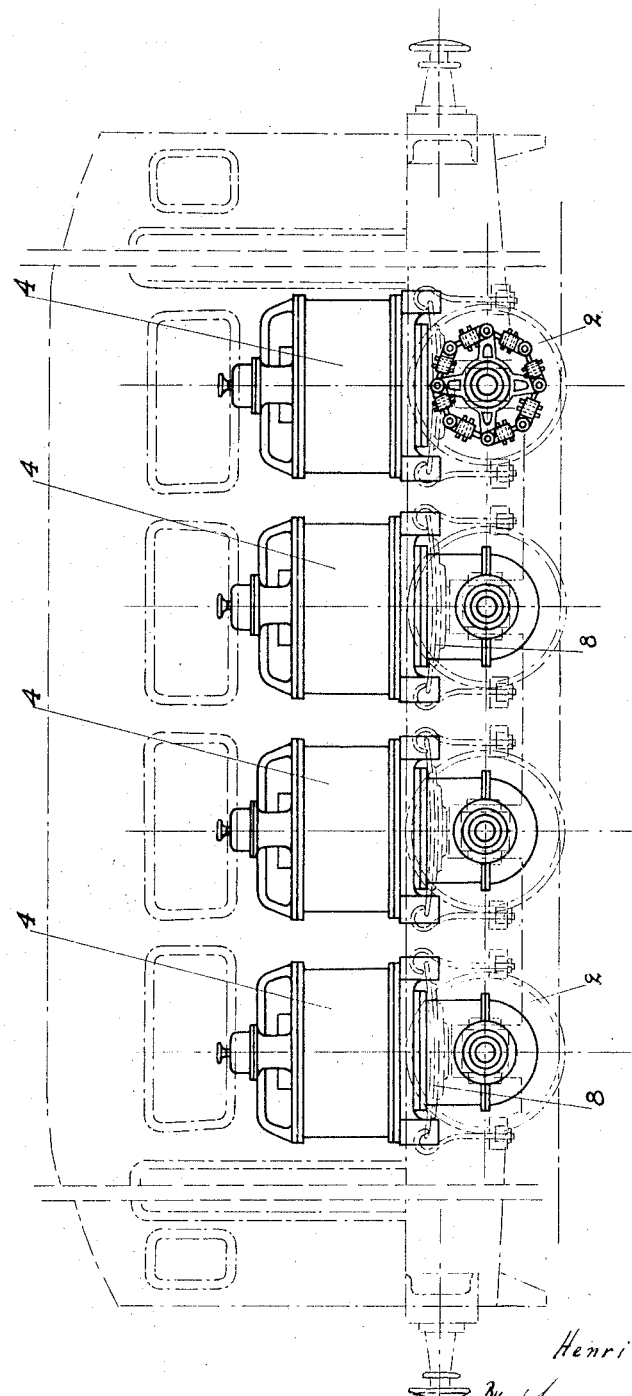
Figure 1 is an elevational view showing the arrangement of the motors above the axles.
Figure 2:
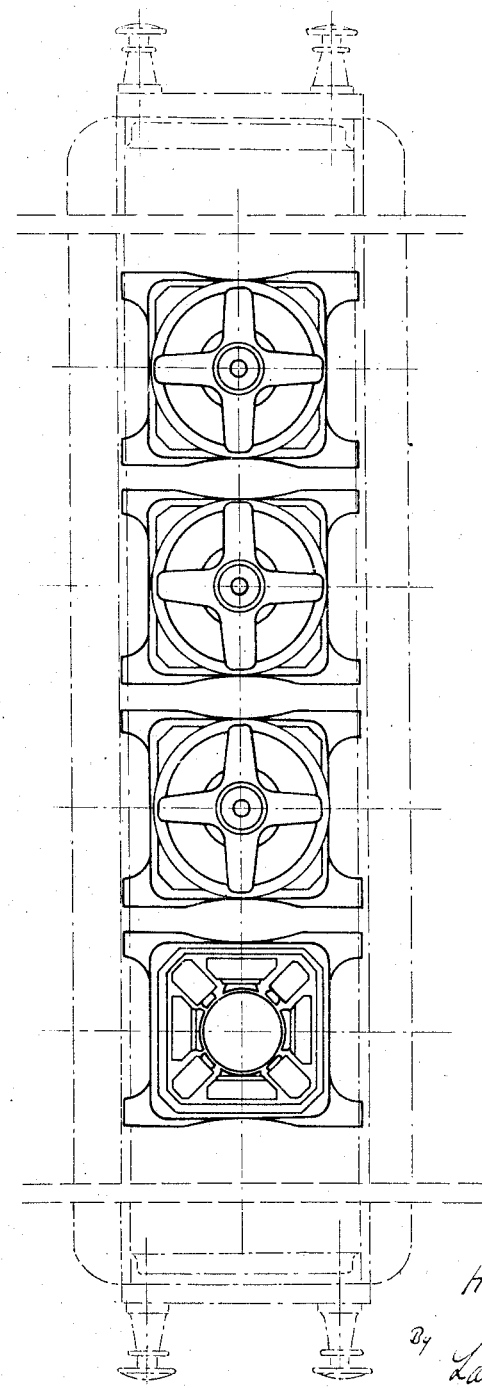
Figure 2 is a plan view with partial section.
Figure 3:
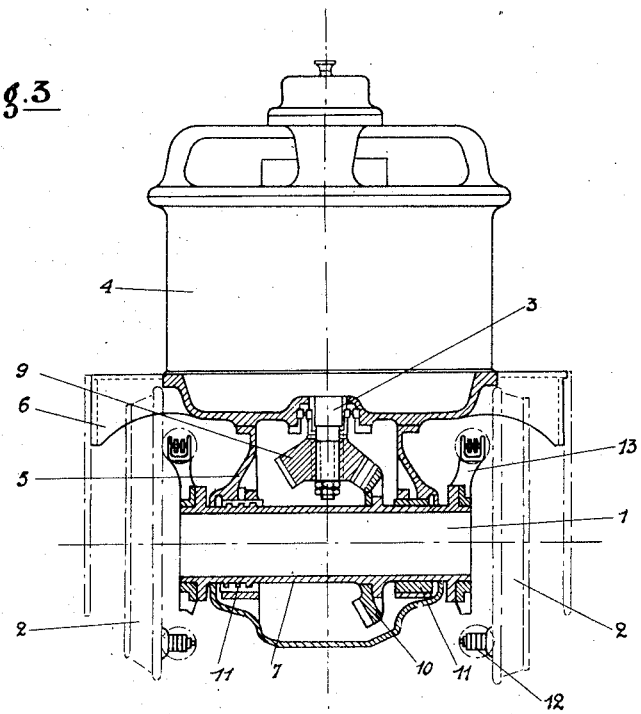
Figure 3 shows a motor which is projected on a plane perpendicularly to an axle.
Figure 4:
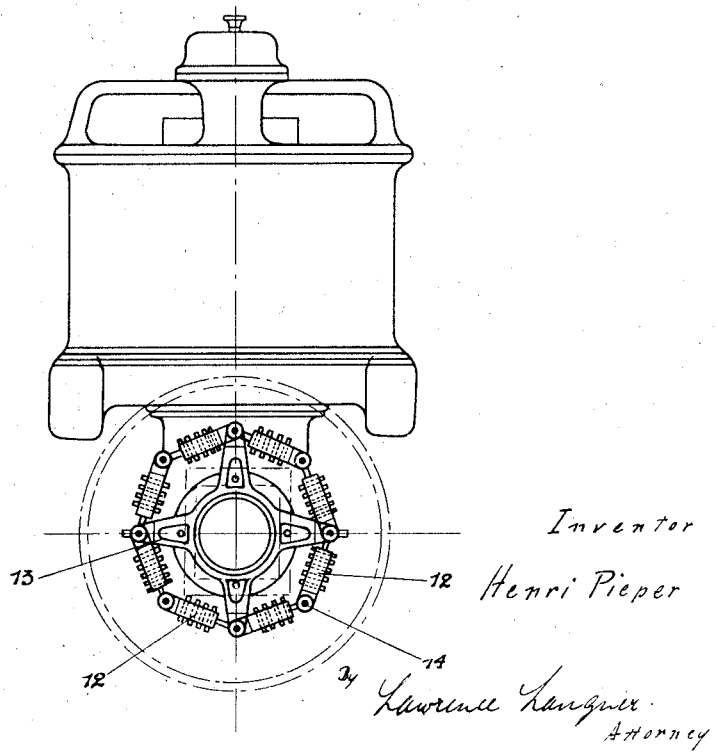
Figure 4 shows a motor projected on a plane perpendicular to an axle.

In order to avoid the influence of gyroscopic effects, the motors may be arranged in such manner that any two adjacent motors rotate in opposite directions The section of Figure 2 shows that in the mode of construction which has just been described, one driving shaft only is arranged in each motor head 4. In contradistinction thereto, in the mode of construction illustrated in Figures 5 to 8, each motor head is provided with two armatures 16 and 17 integral with the two driving shafts 18 and 19 actuating the wheels of one and the same axle. The said two driving shafts actuate both one and the same axle 20, on which conical pinions 21 and 22 are secured, gearing with conical pinions 23 and 24 keyed upon shafts 18 and 19.

The other elements of the transmission members are illustrated in Figures 1 to 4 and are shown by the same reference numerals.

As seen from the section of Figure 6, the magnetic fields of the two rotors 16 and 17 are separated by one single partition 25. This partition determines two consequent poles 26 and 27 of the same polarity for each of the two different magnetic fields.

What I claim is:

1. In an electric locomotive comprising a plurality of axles, a plurality of driving shafts for each axle, said driving shafts being actuated by vertically arranged electric motors, the movement of said driving shafts being transmitted to the axles by means of conical wheels which cause axial pulls on the axles, said conical wheels being arranged back to back whereby said axial pulls are annuled.

2. In an electric locomotive comprising a plurality of axles, a plurality of driving shafts for each axle, said driving shafts being actuated by vertically arranged electric motors, each of said driving shafts carrying an armature, the motors of each plurality of driving shafts being arranged to simultaneously rotate in opposite directions to thereby rotate the axles.

3. In an electric locomotive comprising several axles and several vertically placed motors actuating said axles, the disposition of two shafts actuating the same axle in the casing of each motor, each of the said shafts carrying an armature, the said armatures rotating in two different magnetic fields arranged in one and the same casing.

4. In an electric locomotive comprising several axles and several vertically placed motors actuating said axles, the disposition of two shafts actuating the same axle in the casing of each motor, each of the said shafts carrying an armature, the said armatures rotating in two different magnetic fields arranged in one and the same casing and separated by a partition producing for each of them a consequent pole of the same polarity.

5. In an electric motor, the combination of a plurality of axles, a plurality of driving shafts for each axle, an armature carried by each driving shaft, the armatures of at least two driving shafts for the same axle rotating in different magnetic fields arranged in one and the same casing, a hollow shaft surrounding each axle, transmission gearing between the driving shafts for each axle and the hollow shaft surrounding said axle, and elastic means for transmitting the movement of each hollow shaft to its corresponding axle while permitting the latter to be displaced relative to the former.

6. In an electric locomotive comprising a plurality of axles and a plurality of motors actuating said axles, the disposition of two shafts actuating the same axle in the casing of each motor, each of said shafts carrying an armature, the said armatures rotating in opposite directions in two different magnetic fields arranged in one and the same casing and separated by a partition producing for each of them a consequent pole of the same polarity, a hollow shaft surrounding each axle, gearing for transmitting the movement from the actuating shafts for each axle to the hollow shaft surrounding said axle, and elastic means for transmitting the movement of each hollow shaft to its corresponding axle while permitting the latter to be displaced relative to the former.

In testimony whereof I have signed my name to this specification.

HENRI PIEPER.

Witnesses:
ALFRED VANDER HAEGHEY,
CHARLES MERCHIE.